Oct. 24, 1950 M. A. WIGGINS 2,527,169
COSMETIC RECEPTACLE WITH POWDER PUFF RETAINER
Filed Feb. 9, 1950
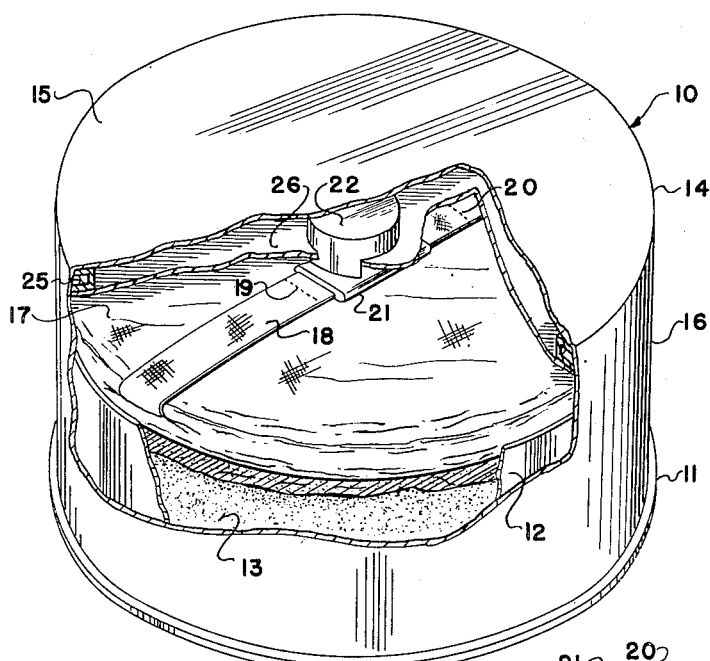
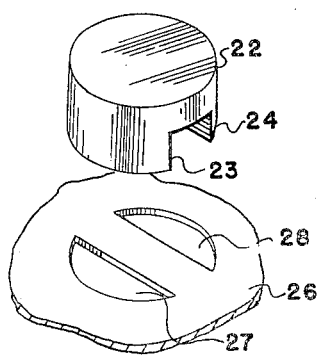
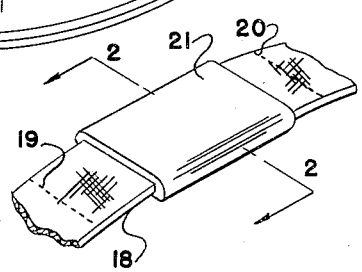
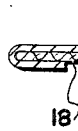
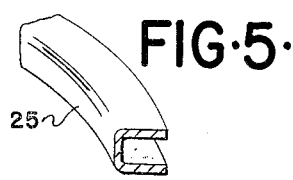
*INVENTOR.*
MABEL A. WIGGINS.
BY
ATTORNEY.

Patented Oct. 24, 1950

2,527,169

UNITED STATES PATENT OFFICE 2,527,169

COSMETIC RECEPTACLE WITH POWDER PUFF RETAINER

Mabel A. Wiggins, Woodside, N. Y.

Application February 9, 1950, Serial No. 143,313

8 Claims. (Cl. 132—82)

This invention pertains to a powder puff retainer for holding a powder puff in a predetermined position, which in the present position is indicated as being suspended.

It is an object of the present invention to provide a retainer for a powder puff for supporting or suspending a powder puff in a predetermined position within a container, with one side of the powder puff being directly exposed to the powder but spaced therefrom.

A further object of the invention is to provide a novel means for suspending a powder puff in a container by employing a permanent magnet and a piece of magnetizable material, one or the other element of which is secured to the powder puff, and the remaining one of which is secured to the container.

A further object of the invention is to provide a container having a wall in the upper structure thereof being spaced from an adjacent wall, and having a permanent magnet secured between said walls and being disposed for effectively attracting a piece of magnetizable material which is secured to a powder puff.

A further object of the invention is to provide a permanent magnet secured to one portion of a container and having an area thereof exposed to engage and magnetically attract a piece of magnetizable material secured to a powder puff or the like.

Further and other objects of the invention may be and may become apparent to one skilled in the art from a perusual of the present showing, and it is to be understood that changes and modifications may be made in the invention without departing from the spirit of the subjoined claims.

The present disclosure is by way of illustration only, of a preferred embodiment of the invention.

In the drawings:

Fig. 1 is a perspective view of the invention, showing the container partially broken away.

Fig. 2 is an enlarged perspective view, partially broken away, showing the permanent magnet disposed for securing to one wall of the container.

Fig. 3 is a perspective view showing a piece of magnetizable material secured to a strap of a powder puff.

Fig. 4 is a sectional view taken along lines 2—2 of Fig. 3.

Fig. 5 is a perspective view partially broken away of a spacer used between a wall member and the outer shell of the container for providing a space for the magnet.

Referring to the drawings there is shown a container 10 having a base 11 with a cylindrical portion 12 secured to said base 11 forming a base and side wall retainer for the powder 13 contained therein. The cover 14 has a top portion 15 and a cylindrical portion 16 which fits about the cylindrical portion 12 of the base.

A powder puff 17 has a strap 18 secured to opposing sides of said powder puff and may be stitched by rows of stitching 19 and 20 on opposing sides of the piece of magnetizable material 21 which may be referred to herein as the keeper.

In the present instance the keeper 21 is a thin strip of magnetizable material which is bent around the strap 18 and gripped as shown in the cross section presented in Fig. 4. The upper flat surface area of the keeper, shown in Fig. 3, is of an area greater than that of the lower outside dimension of the permanent magnet 22.

The permanent magnet 22 is substantially a horseshoe magnet in that the two protruding portions 23 and 24 may represent the north and south poles of the permanent magnet 22. The keeper 21 is flat on the upper face thereof as is the surface of the pole faces 23 and 24 of the permanent magnet 22.

The keeper of the magnet is of a surface area greater than that of the permanent magnet pole faces in their largest dimension, and the keeper is substantially centrally disposed on a powder puff having a dimension, when in the container in normal use substantially the same size as the inner diameter of the base cylinder so that the powder puff will have the keeper of the magnet substantially in the center of the container when in normal use.

A spacer 25 is channel-shaped, or substantially U-shaped in a cross section thereof and is normally secured to the underneath surface of the top portion 15, to act as a spacer for disposing the partition 26 in spatial relationship with the top partition 15.

The permanent magnet 22 fits into the cut-out portions 27 and 28 which are of sufficient area to permit the pole faces 23 and 24 to penetrate therethrough and to protrude on the underneath side of said partition 26, as shown, so that the pole faces may engage the magnetizable material or keeper 21.

The partition 26 is secured to the spacer 25 by an adhesive. The space between the partition 26 and the top portion 15 is sufficient to permit the body portion of the permanent magnet to be disposed therein.

The permanent magnet may be secured in the cut-out portions 27 and 28 by frictionally engaging the sides of said cut-out portions, as in the present showing, or the magnet may be secured in any other convenient manner.

While a specific form of permanent magnet is shown in this presentation, it is to be understood that any form of permanent magnet may be used within the container, and any form of keeper may be used, and said keeper and permanent magnet may be used either on the container or the powder puff. Any suitable arrangement may be devised provided it is within the spirit of the subjoined claims.

From the foregoing it will be seen that in normal use it is merely necessary to place the powder puff in the cover of the powder box with the magnetizable material or keeper facing the inner portion of the cover. In this way the powder puff which is secured to the magnetizable material will be held securely in continuous relationship with the underneath surface of the magnet of the cover. When the cover is placed on the base portion of the powder box, the powder puff will be retained in its removable predetermined position. When the powder puff is in its normal position within the cover member it will be seen from Fig. 1 that it is spaced from the powder per se.

While the keeper is shown secured to the strap of a powder puff, it is to be understood that the keeper may be directly secured to the powder puff per se.

By employing the invention herewith, the powder puff may be disposed within the powder box but is spaced from the powder so that the powder puff is not in engagement with the powder.

The material of which the powder puff is made is such that a center point suspension of the powder puff will not permit it to droop into the powder. A stiffening member may be used in the powder puff as an additional portion of said powder puff if this feature is desirable. However, the inherent rigidity of the material of the powder puff is ordinarily sufficient to present the desired results.

While a horseshoe type magnet is shown in the present invention it is to be understood that a simple bar magnet may be used without departing from the spirit of the invention.

What is claimed as new and desired to be secured by Letters Patent of the United States is:

1. A powder puff retainer for removably securing a powder puff to the underneath surface of a cover comprising a permanent magnet secured to the upper portion of the cover and having a portion thereof centrally exposed below the underneath surface of the cover within a powder container, a keeper having securing means for being secured to a powder puff, said keeper having one surface area of sufficient size to engage said magnet and be retained thereby when supporting a powder puff secured thereto.

2. A powder puff retainer for removably securing a powder puff to the underneath surface of a cover comprising a permanent magnet secured to the upper portion of the cover and having a portion thereof exposed below the underneath surface of the cover within a powder container, a keeper having yieldable securing means for being secured to a powder puff, said keeper having one surface area of sufficient size to engage said magnet and be retained thereby when supporting a powder puff secured thereto.

3. A powder puff retainer for removably securing a powder puff to the interior of a cover comprising a permanent magnet secured to the upper portion of the cover and centrally disposed therewith and having a portion thereof centrally exposed below the underneath surface of the cover within a powder container, a keeper having securing means for being secured to a powder puff, said keeper having one surface area of sufficient size to engage said magnet and be retained thereby when supporting a powder puff secured thereto.

4. A powder puff retainer for removably securing a powder puff to the interior of a cover comprising a permanent magnet secured to the upper portion of the cover and having a portion thereof exposed below the underneath surface of the cover within a powder container, a keeper, means for securing said keeper to a powder puff, said keeper having one surface area of sufficient size to engage said magnet and be retained thereby when supporting a powder puff secured thereto, and partition means for centrally disposing the magnet within the confines of the cover.

5. In a container for powder, a powder puff retainer for removably holding a powder puff adjacent the underneath surface of a cover, comprising a permanent magnet, means for securing said permanent magnet adjacent the upper portion of the cover and having a portion of said permanent magnet centrally exposed below the underneath surface of the cover within the powder container, a magnet keeper, means for securing said magnet keeper to a powder puff, said keeper having a surface area of sufficient size to engage said magnet and be retained thereby when supporting a powder puff secured thereto, the disposition of the magnet keeper relative to the powder puff being a determining factor in the centralization of the powder puff in relation to the magnet.

6. In a device for centrally removably disposing a powder puff within a container having a cover, comprising a base portion and having confining side walls, a cover portion having confining side walls complemental to the side walls of said base portion, a permanent magnet secured within the confines of the cover portion, a powder puff adapted to loosely fit within the confines of the base portion, a piece of magnetizable material secured to said powder puff, and means for centrally aligning the magnetizable material secured to the powder puff with the permanent magnet secured to the cover.

7. In a device for centrally removably disposing a powder puff within a container having a cover, a base portion having a confining side wall structure complemental to the side wall structure of said base portion, a permanent magnet secured within the confines of the cover portion, a powder puff adapted to be removably retained within the confines of the cover portion, a piece of magnetizable material adapted to be secured to said powder puff, and means for centrally aligning the magnetizable material adapted to be secured to the powder puff with the permanent magnet secured to the cover.

8. In a device for centrally removably disposing a powder puff within a container having a cover, a base portion, a cover portion complemental to the base portion, a permanent magnet secured within the confines of the cover portion, a powder puff adapted to set within the confines of the cover portion, a piece of magnetizable material securable to said powder puff, and means for centrally aligning the magnetizable material with the permanent magnet secured to the cover.

MABEL A. WIGGINS.

No references cited.